United States Patent [19]
Matsuo

[11] Patent Number: 5,353,158
[45] Date of Patent: Oct. 4, 1994

[54] ALBADA TYPE ZOOM FINDER

[75] Inventor: Hirofumi Matsuo, Tokyo, Japan

[73] Assignee: Asahi Kogaku Kogyo Kabushiki Kaisha, Tokyo, Japan

[21] Appl. No.: 836,715

[22] Filed: Feb. 19, 1992

[30] Foreign Application Priority Data

Feb. 19, 1991 [JP] Japan .................. 3-109945

[51] Int. Cl.$^5$ .................. G02B 15/14; G02B 13/18
[52] U.S. Cl. .................. 359/688; 359/715
[58] Field of Search .................. 359/688, 715

[56] References Cited

U.S. PATENT DOCUMENTS

| | | | |
|---|---|---|---|
| 4,038,673 | 7/1977 | Schroder | 354/222 |
| 4,834,513 | 5/1989 | Nozawa | 359/688 |
| 4,992,809 | 2/1991 | Nozaki et al. | 354/222 X |
| 5,052,787 | 10/1991 | Sugawara | 359/683 |

FOREIGN PATENT DOCUMENTS

| | | |
|---|---|---|
| 3806942 | 9/1988 | Fed. Rep. of Germany . |
| 58-129017 | 5/1983 | Japan . |
| 61-87122 | 2/1986 | Japan . |
| 2225871 | 6/1990 | United Kingdom . |

Primary Examiner—Scott J. Sugarman
Attorney, Agent, or Firm—Sandler, Greenblum & Bernstein

[57] ABSTRACT

An Albada zoom finder includes a first lens assembly of positive power, a second lens assembly of negative power, a third lens assembly of negative power and a fourth lens assembly of positive power, arranged in this order from the object side of a camera. An Albada frame is provided on the lens surface of the fourth positive lens assembly on the object side thereof. A reflecting surface is provided on the lens surface of the third negative lens assembly on the viewing side thereof, wherein each of the four lens assemblies is comprised of a single lens. Only the second negative lens is movable as a variable power lens assembly.

12 Claims, 8 Drawing Sheets

ASTIGMATISM    COMA    DISTORTION

FIG. 7

ASTIGMATISM    COMA    DISTORTION

FIG. 8

ASTIGMATISM    COMA    DISTORTION

ASTIGMATISM    COMA    DISTORTION

ALBADA TYPE ZOOM FINDER

BACKGROUND OF THE INVENTION

1. Field of the Invention

The present invention relates to an Albada type zoom finder separate from a photographing optical system.

2. Description of Related Art

In a recent known lens shutter type camera or still video camera, the photographing optical system and finder optical system are both comprised of zoom lenses. An Albada zoom finder is usually used as a finder in this case. However, a conventional Albada zoom finder includes a large number of lens elements and two or more movable lens assemblies (groups) for changing the magnification (power). This makes it difficult to provide a simple, small and inexpensive Albada zoom finder.

SUMMARY OF THE INVENTION

The primary object of the present invention is to provide a simple, small and inexpensive Albada type zoom finder.

To achieve the object mentioned above, according to the present invention, there is provided an Albada zoom finder comprising a first lens assembly of positive power, a second lens assembly of negative power, a third lens assembly of negative power and a fourth lens assembly of positive power, arranged in this order from the object side of a camera. Each of the four lens assemblies includes a single lens. An Albada frame is provided on the lens surface of the fourth positive lens assembly on the object side thereof. A reflecting surface is provided on the lens surface of the third negative lens assembly on the viewing side thereof. Only the second negative lens assembly is movable as a variable power lens assembly.

Preferably, each of the four lens assemblies includes a single lens to reduce the number of necessary lenses.

If each lens is made of a plastic lens, an aspheric lens can be easily provide.

Preferably, the first positive lens includes a meniscus lens having a concave surface on the object side.

To miniaturize the first lens, it is desirable to decrease the refractive index thereof. To this end, at least one lens surface thereof, and preferably both lens surfaces thereof are made of aspheric surfaces having a positive refractive index which decreases in the radial direction toward the circumferential portion of the lens surfaces. This prevents a large positive distortion which would otherwise occur.

Preferably, at least one lens surface of the second negative lens, and preferably both lens surfaces thereof are made of aspheric surfaces having circumferential portions projecting toward the viewing side thereof. Thus the angle of deflection of the light transmitted through the second negative lens on the large magnification side can be reduced, resulting in a decreased aperture diameter of the first positive lens.

Preferably, the lens surface of the second negative lens, on the object side thereof, has a radius of curvature having an absolute value smaller than that of the lens surface thereof on the viewing side. This makes it possible to position the second lens close to the third negative lens, so that a large magnification can be obtained. This also provides for a greater displacement of the second negative lens. Accordingly, the refractive indexes of the first positive lens and the second negative lens can be decreased. Consequently, the aperture diameter of the first lens can be reduced, and accordingly, the whole lens system can be miniaturized.

Preferably, the lens surface of the third negative lens on the object side thereof is made of an aspheric surface having a negative refractive index which decreases in the radial direction toward the circumferential portion thereof. This aspheric surface contributes to a reduction in the aperture diameters of the first positive lens and the second negative lens, similar to the aspheric surface(s) of the second lens. The lens surface of the third negative lens on the viewing side constitutes a reflecting surface of the Albada optical system which requires higher precision in surface finish than transmission surfaces. To this end, the lens surface of the third negative lens on the viewing side is made of a spherical surface which can be easily tested.

The Albada frame (view frame) is evaporated on the lens surface of the fourth positive lens on the object side. Therefore, the lens surface of the fourth positive lens on the object side is preferably a flat surface. It is also preferred that, the lens surface of the fourth positive lens on the viewing side is made of an aspheric surface having a positive refractive index which decreases in the radial direction toward the circumferential portion thereof. Due to this aspheric surface, the curvature of the field of the Albada optical system can be corrected. Namely, the Albada optical system is prevented from having a positive dioptric power at the circumferential portion.

All of the first, second, third, and fourth lenses can be made of plastic. Plastic lenses reduce the manufacturing cost of the zoom finder as a whole.

The present disclosure relates to subject matter contained in Japanese Patent Application No. 03-109945 (filed on Feb. 19, 1991) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENTS

The following discussion will be directed to four embodiments (E1, E2, E3 and E4) of the present invention. In the following discussion, the astigmatisms in the aberration diagrams are represented with reference to dioptric powers of light on the optical axis.

|  | E1 | E2 | E3 | E4 |
| --- | --- | --- | --- | --- |
| small magnification | −1.03 | −0.92 | −1.04 | −1.11 |
| large magnification | −0.83 | −0.10 | −0.96 | −0.92 |
| Albada | −1.00 | −1.04 | −1.08 | −1.18 |

(unit: Dpt.)

In the four embodiments,

No.: number (order) of lens surfaces of lens assemblies counting from the object side r: radius of curvature of each lens surface d: distance between adjacent lens surfaces N: refractive index In the diagrams, "B" designates the angle of light incident upon an exit pupil of $\phi$ 3 mm.

Note that the Albada frame is attached to the seventh lens surface, and the reflecting surface is formed on the sixth lens surface, respectively.

Embodiment 1: E1

Figure 1:
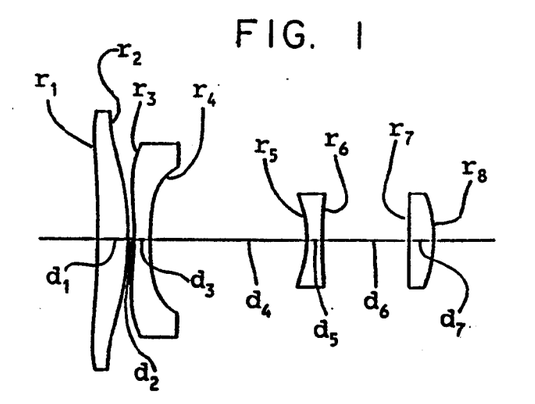
FIG. 1 is a sectional view of an Albada zoom finder at a small magnification, according to a first embodiment of the present invention.
Figure 2:
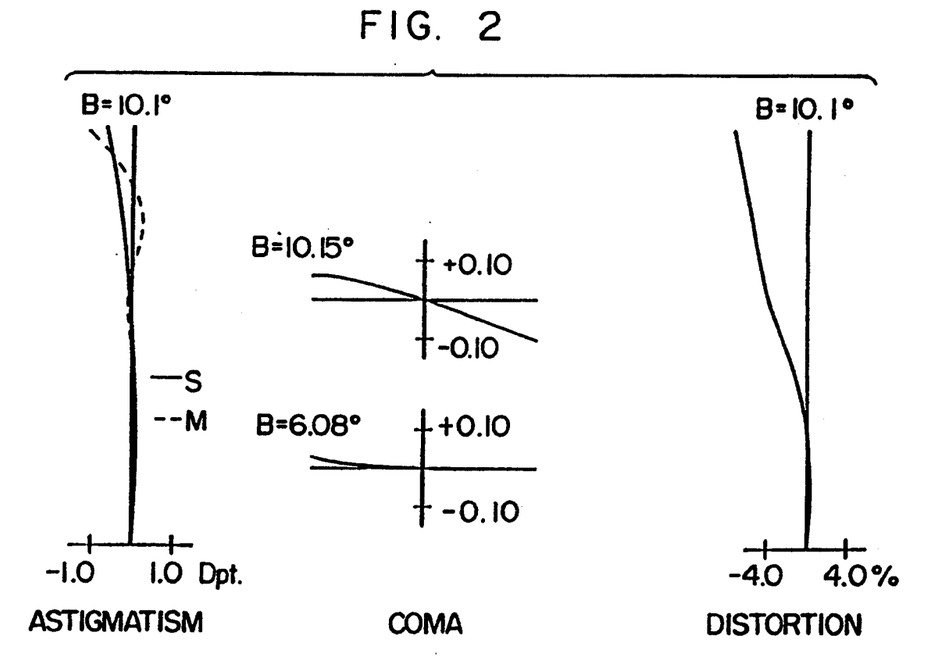
FIG. 2 is a diagram showing an aberration of a lens system at a small magnification, as shown in FIG. 1.
Figure 3:
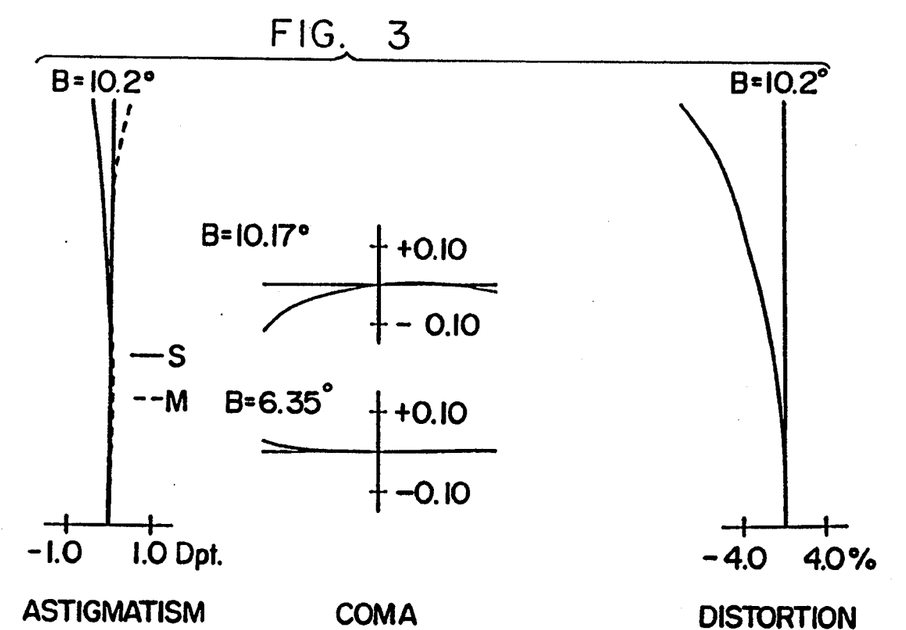
FIG. 3 is a diagram showing an aberration of a lens system at a large magnification, as shown in FIG. 1.
Figure 4:
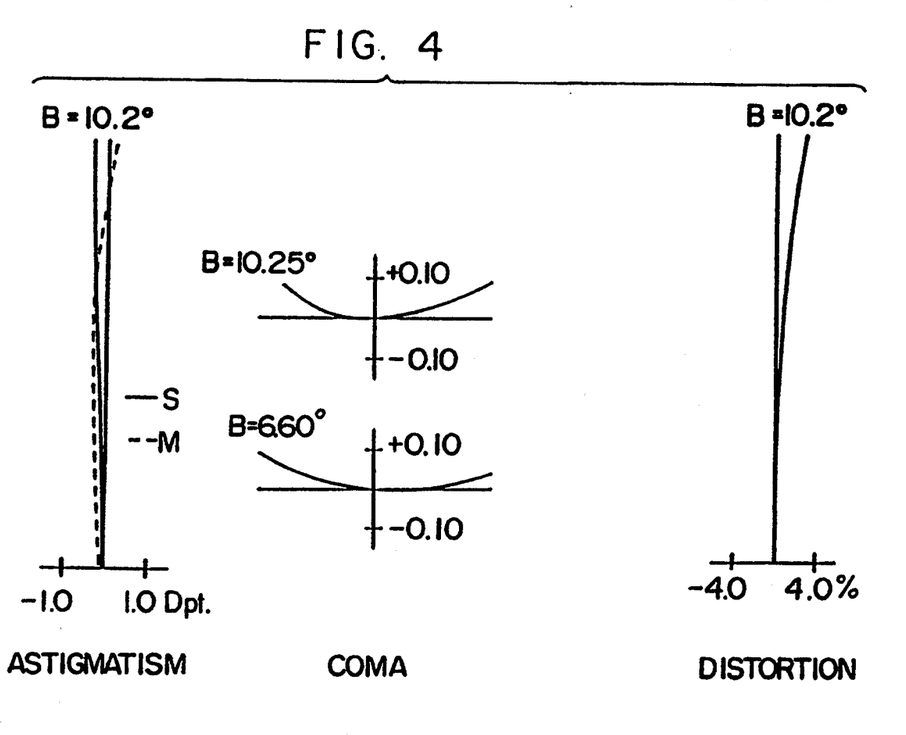
FIG. 4 is a diagram showing an aberration of an Albada system, as in a lens system shown in FIG. 1.

FIG. 1 shows an optical lens arrangement of an Albada zoom finder, according to a first embodiment of the present invention. Table 1, below, shows lens data thereof. FIGS. 2 and 3 show aberration diagrams at a small magnification and a large magnification. FIG. 4 shows an aberration diagram of an Albada system in the lens arrangement, respectively.

TABLE 1

| Surface No. | $\omega = 25° \sim 17°$ | | |
| --- | --- | --- | --- |
|  | r | d | N |
| 1 | * −128.100 | 2.650 | 1.49176 |
| 2 | * −22.487 | 0.500~11.800 |  |
| 3 | * −22.716 | 1.400 | 1.49176 |
| 4 | * 28.331 | 13.630~2.330 |  |
| 5 | * −8.248 | 1.350 | 1.49176 |
| 6 | 39.102 | 7.430 |  |
| 7 | ∞ | 2.100 | 1.49176 |
| 8 | * −10.462 | 13.000 |  |

In Table 1, * designates an aspheric surface, and the aspheric data is as follows.

| Surface No. 1: | $K = -5.55 \times 10^2$; | $A4 = -1.157 \times 10^{-4}$; |
| --- | --- | --- |
|  | $A6 = 1.251 \times 10^{-6}$; | $A8 = -1.695 \times 10^{-9}$ |
| Surface No. 2: | $K = 5.55 \times 10^{-1}$; | $A4 = -1.437 \times 10^{-5}$; |
|  | $A6 = 9.683 \times 10^{-7}$; | $A8 = -6.957 \times 10^{-10}$ |
| Surface No. 3: | $K = -7.53 \times 10^1$; | $A4 = 1.784 \times 10^{-4}$; |
|  | $A6 = 3.489 \times 10^{-6}$; | $A8 = -2.545 \times 10^{-8}$; |
|  | $A10 = -5.643 \times 10^{-12}$ |  |

-continued

| Surface No. 4: | $K = 1.65 \times 10^1$; | $A4 = 7.645 \times 10^{-4}$; |
| --- | --- | --- |
|  | $A6 = 1.016 \times 10^{-5}$; | $A8 = 4.000 \times 10^{-7}$ |
| Surface No. 5: | $K = -1.42 \times 10^{-1}$; | $A4 = 7.256 \times 10^{-4}$; |
|  | $A6 = -1.004 \times 10^{-5}$; | $A8 = 2.434 \times 10^{-7}$; |
|  | $A10 = 8.984 \times 10^{-9}$ |  |
| Surface No. 8: | $K = -9.76 \times 10^0$; | $A4 = -8.281 \times 10^{-4}$; |
|  | $A6 = 2.089 \times 10^{-5}$; | $A8 = -2.795 \times 10^{-7}$ |

Embodiment 2: E2

Figure 5:
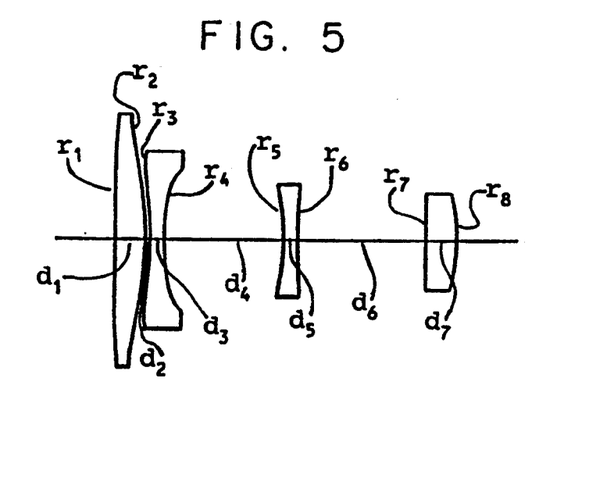
FIG. 5 is a sectional view of an Albada zoom finder at a small magnification, according to a second embodiment of the present invention.
Figure 6:
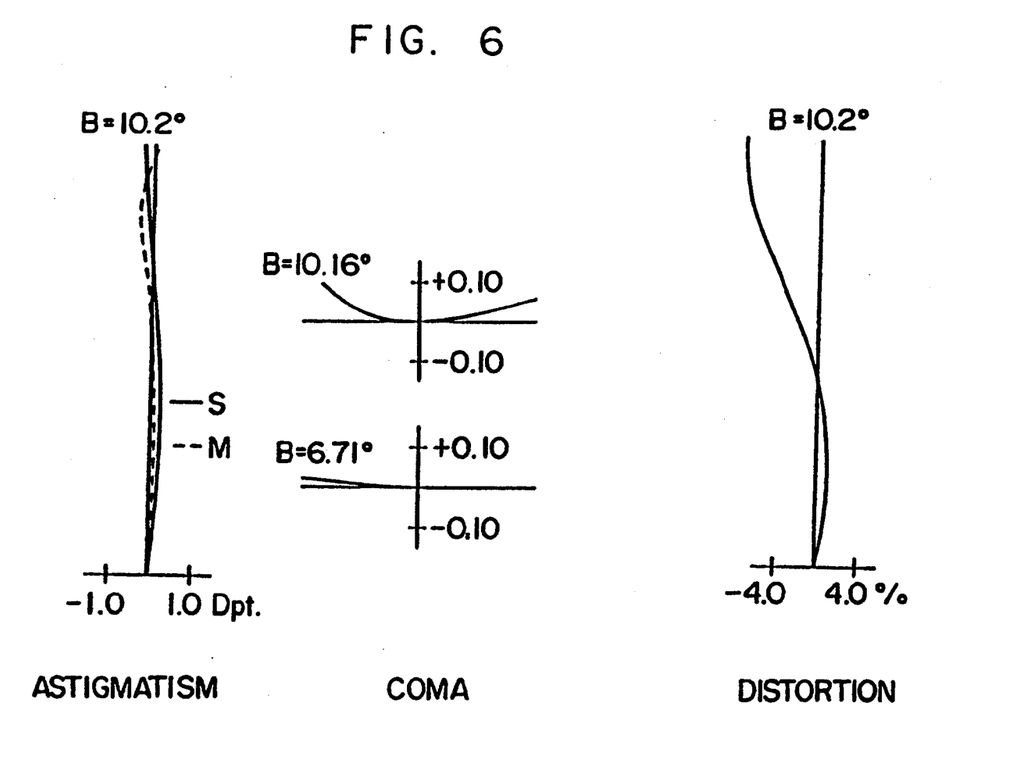
FIG. 6 is a diagram showing an aberration of a lens system at a small magnification, as shown in FIG. 5.
Figure 7:
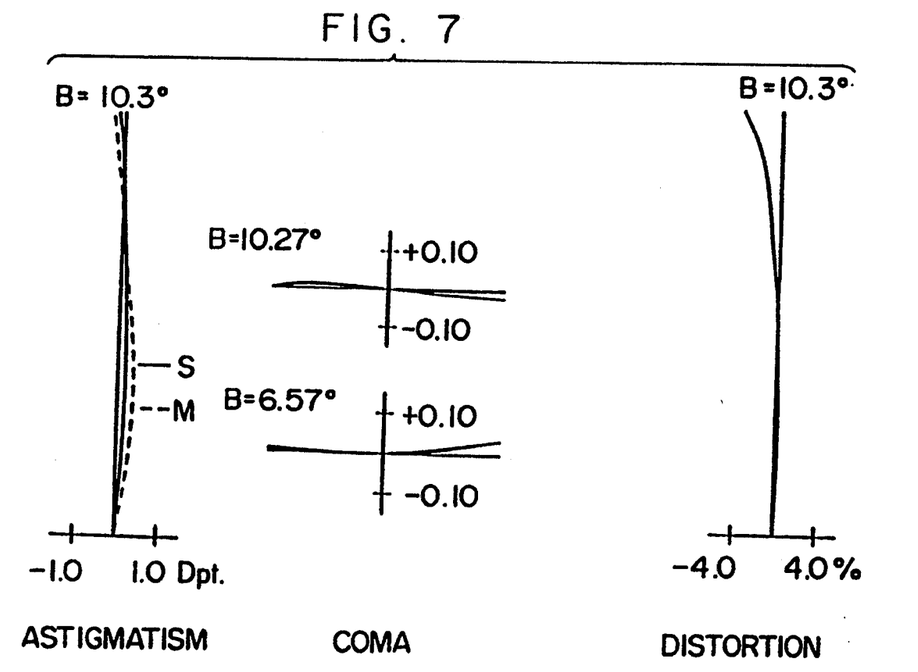
FIG. 7 is a diagram showing an aberration of a lens system at a large magnification, as shown in FIG. 5.
Figure 8:
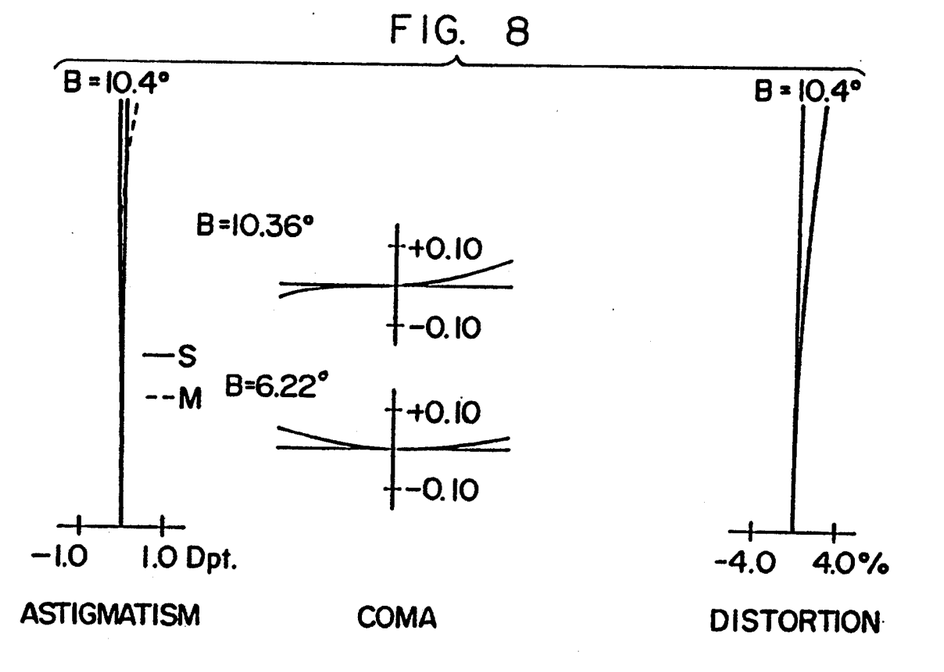
FIG. 8 is a diagram showing an aberration of an Albada system, as in a lens system shown in FIG. 5.

FIG. 5 shows a second embodiment of an Albada zoom finder, according to the present invention, similar to FIG. 1. Table 2, below, shows lens data thereof. FIGS. 6 and 7 show aberration diagrams at a small magnification and a large magnification. FIG. 8 shows an aberration diagram of an Albada system in the lens arrangement, respectively.

TABLE 2

| Surface No. | $\omega = 23° \sim 16°$ | | |
| --- | --- | --- | --- |
|  | r | d | N |
| 1 | * −871.000 | 2.560 | 1.49176 |
| 2 | * −25.129 | 0.400~9.000 |  |
| 3 | * −20.050 | 1.200 | 1.49176 |
| 4 | * 26.807 | 10.060~1.460 |  |
| 5 | * −17.019 | 1.200 | 1.49176 |
| 6 | 53.688 | 10.750 |  |
| 7 | ∞ | 2.570 | 1.49176 |
| 8 | * −15.448 | 13.000 |  |

In Table 2, * designates an aspheric surface, and the aspheric data is as follows.

| Surface No. 1: | $K = -5.55 \times 10^2$; | $A4 = -3.092 \times 10^{-5}$; |
| --- | --- | --- |
|  | $A6 = 1.433 \times 10^{-6}$; | $A8 = -8.152 \times 10^{-9}$ |
| Surface No. 2: | $K = 1.17 \times 10^0$; | $A4 = 5.380 \times 10^{-5}$; |
|  | $A6 = 1.015 \times 10^{-6}$; |  |
|  | $A8 = -6.500 \times 10^{-9}$ |  |
| Surface No. 3: | $K = -7.54 \times 10^1$; | $A4 = -1.774 \times 10^{-4}$; |
|  | $A6 = 5.780 \times 10^{-6}$; | $A8 = -1.505 \times 10^{-8}$; |
| Surface No. 4: | $K = 1.78 \times 10^1$; | $A4 = 4.645 \times 10^{-4}$; |
|  | $A6 = -1.347 \times 10^{-5}$; | $A8 = 3.411 \times 10^{-7}$ |
| Surface No. 5: | $K = -2.2 \times 10^{-1}$; | $A4 = 2.367 \times 10^{-4}$; |
|  | $A6 = 1.117 \times 10^{-6}$; | $A8 = 3.161 \times 10^{-8}$; |
| Surface No. 8: | $K = -1.09 \times 10^1$; | $A4 = -2.800 \times 10^{-4}$; |
|  | $A6 = 4.493 \times 10^{-6}$; | $A8 = -8.591 \times 10^{-8}$ |

Embodiment 3: E3

Figure 9:
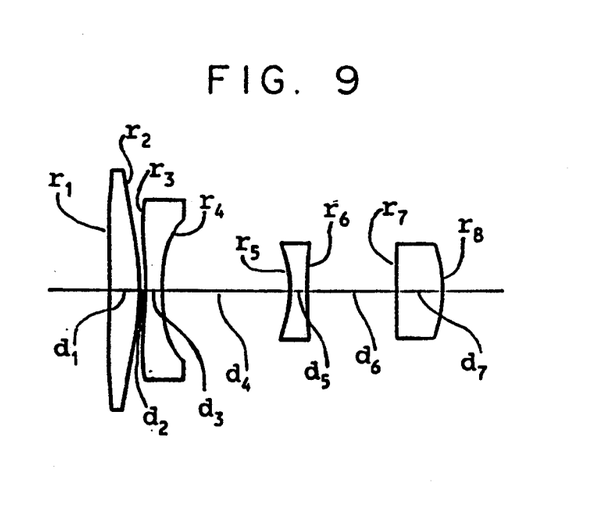
FIG. 9 is a sectional view of an Albada zoom finder at a small magnification, according to a third embodiment of the present invention.
Figure 10:
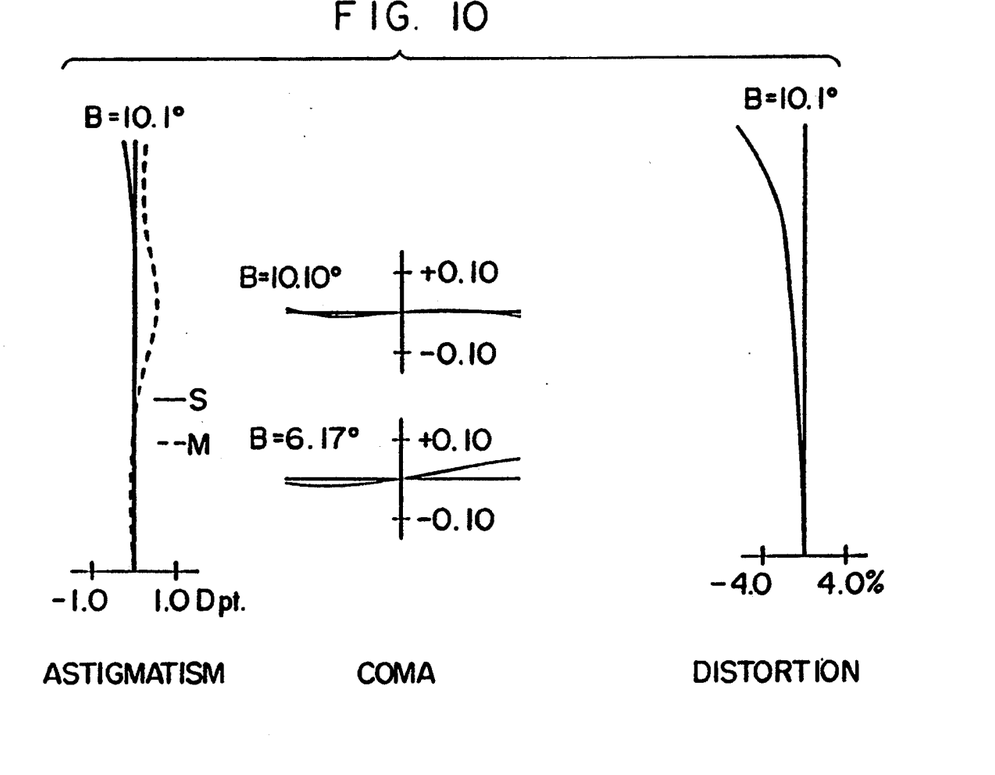
FIG. 10 is a diagram showing an aberration of a lens system at a small magnification, as shown in FIG. 9.
Figure 11:
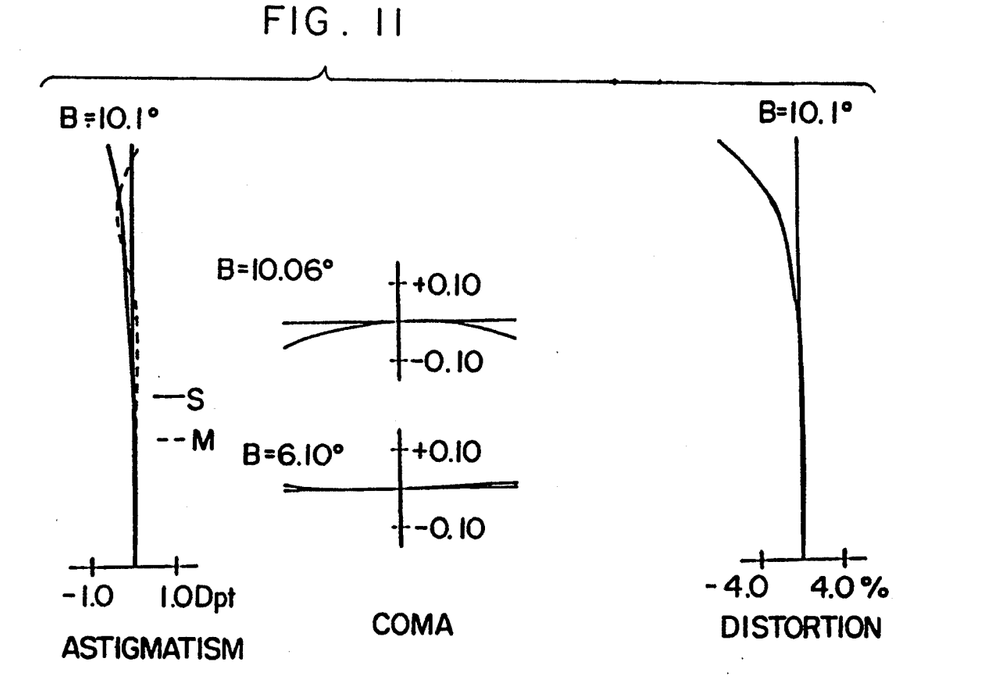
FIG. 11 is a diagram showing an aberration of a lens system at a large magnification, as shown in FIG. 9.
Figure 12:
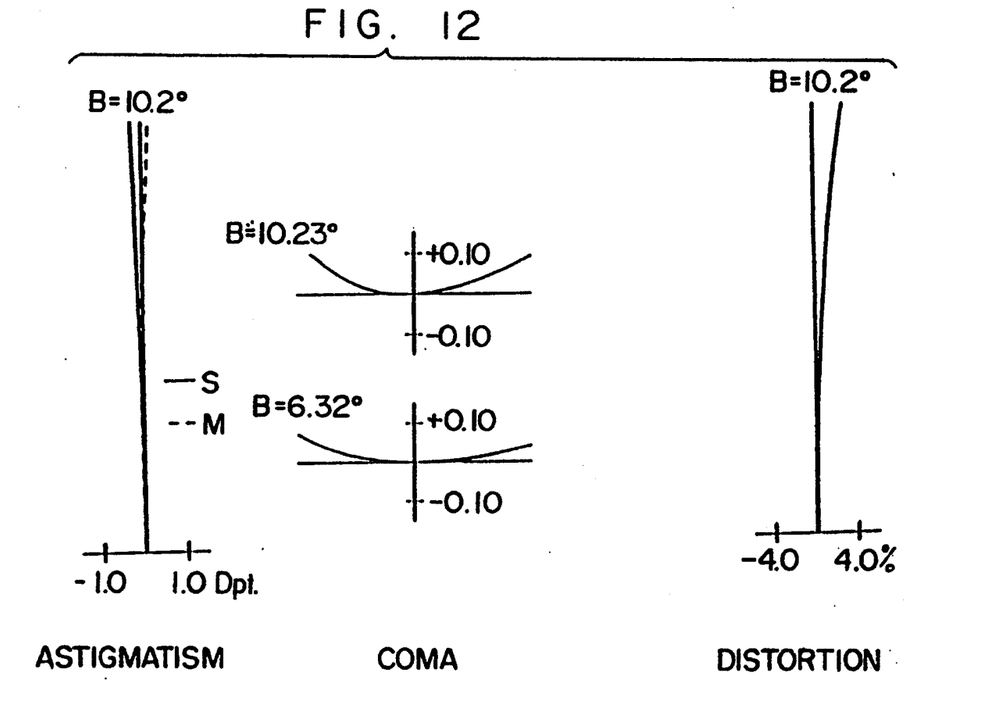
FIG. 12 is a diagram showing an aberration of an Albada system, as in a lens system shown in FIG. 9.

FIG. 9 shows a third embodiment of an Albada zoom finger, according to the present invention, similar to FIG. 1. Table 3, below, shows lens data thereof. FIGS. 10 and 11 show aberration diagrams at a small magnification and a large magnification. FIG. 12 shows an aberration diagram of an Albada system in the lens arrangement, respectively.

TABLE 3

| Surface No. | $\omega = 25° \sim 17.5°$ | | |
| --- | --- | --- | --- |
|  | r | d | N |
| 1 | * −96.677 | 2.470 | 1.49176 |
| 2 | * −19.764 | 0.500~9.500 |  |
| 3 | * −20.105 | 1.400 | 1.49176 |
| 4 | * 26.024 | 10.730~1.730 |  |
| 5 | * −9.326 | 1.400 | 1.49176 |
| 6 | 37.267 | 7.470 |  |
| 7 | ∞ | 3.830 | 1.49176 |
| 8 | * −11.347 | 13.000 |  |

In Table 3, * designates an aspheric surface, and the aspheric data is as follows.

| Surface No. 1: | $K = -5.55 \times 10^2$; | $A4 = -2.442 \times 10^{-5}$; |
| --- | --- | --- |
| | $A6 = 2.274 \times 10^{-6}$; | $A8 = -1.626 \times 10^{-8}$ |
| Surface No. 2: | $K = 6.67 \times 10^{-1}$; | $A4 = 1.292 \times 10^{-4}$; |
| | $A6 = 1.275 \times 10^{-6}$; | $A8 = -1.168 \times 10^{-8}$ |
| Surface No. 3: | $K = -7.45 \times 10^1$; | $A4 = 3.126 \times 10^{-5}$; |
| | $A6 = 7.493 \times 10^{-6}$; | $A8 = -1.359 \times 10^{-7}$; |
| | $A10 = 8.394 \times 10^{-10}$ | |
| Surface No. 4: | $K = 1.61 \times 10^1$; | $A4 = 1.000 \times 10^{-3}$; |
| | $A6 = -3.700 \times 10^{-5}$; | $A8 = 1.330 \times 10^{-6}$; |
| | $10 = -1.633 \times 10^{-8}$ | |
| Surface No. 5: | $K = 0$; | $A4 = 4.073 \times 10^{-4}$; |
| | $A6 = 3.344 \times 10^{-6}$; | $A8 = 1.066 \times 10^{-7}$; |
| Surface No. 8: | $K = -8.62 \times 10^0$; | $A4 = -5.913 \times 10^{-4}$; |
| | $A6 = 1.331 \times 10^{-5}$; | $A8 = -1.689 \times 10^{-7}$ |

Embodiment 4: E4

Figure 13:
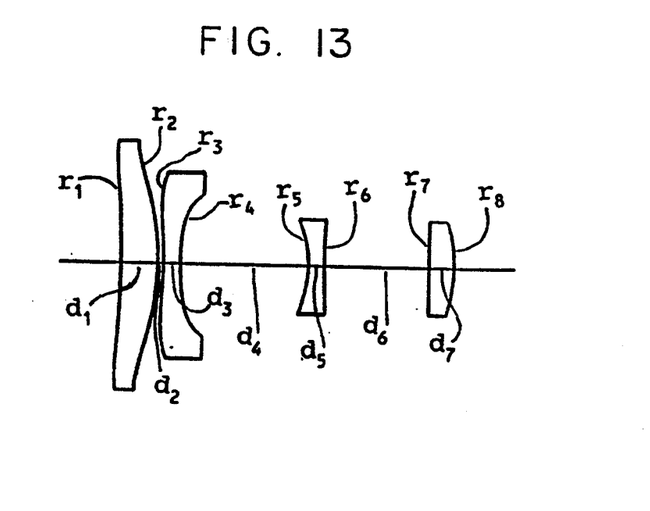
FIG. 13 is a sectional view of an Albada zoom finder at a small magnification, according to a fourth embodiment of the present invention.
Figure 14:
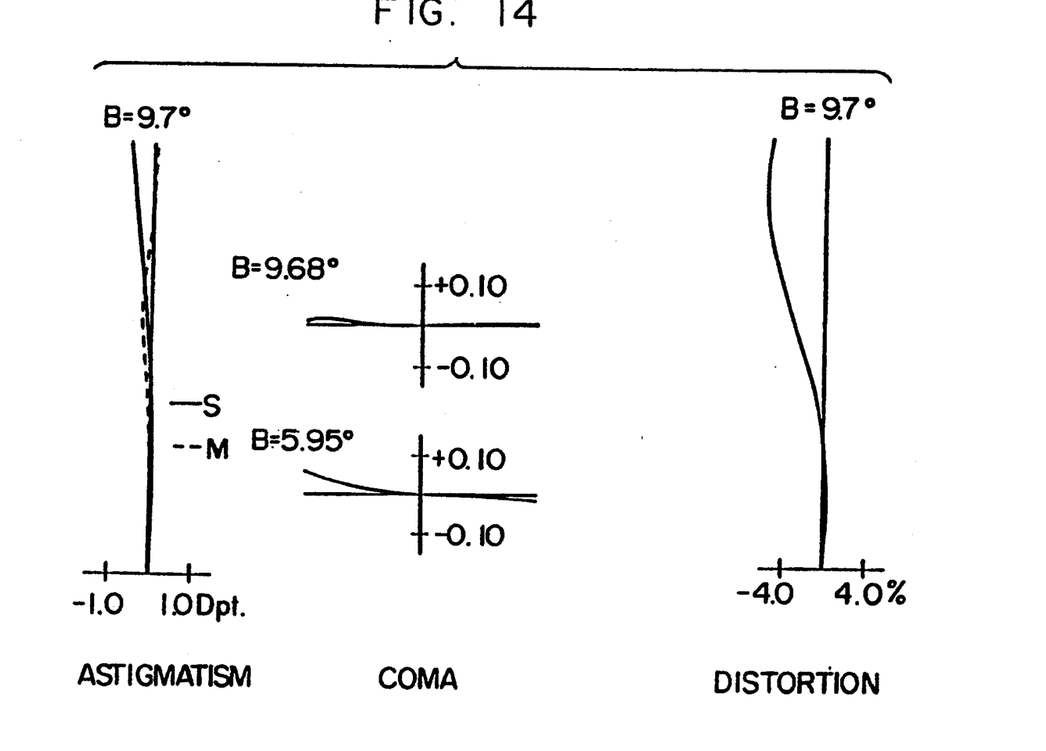
FIG. 14 is a diagram showing an aberration of a lens system at a small magnification, as shown in FIG. 13.
Figure 15:
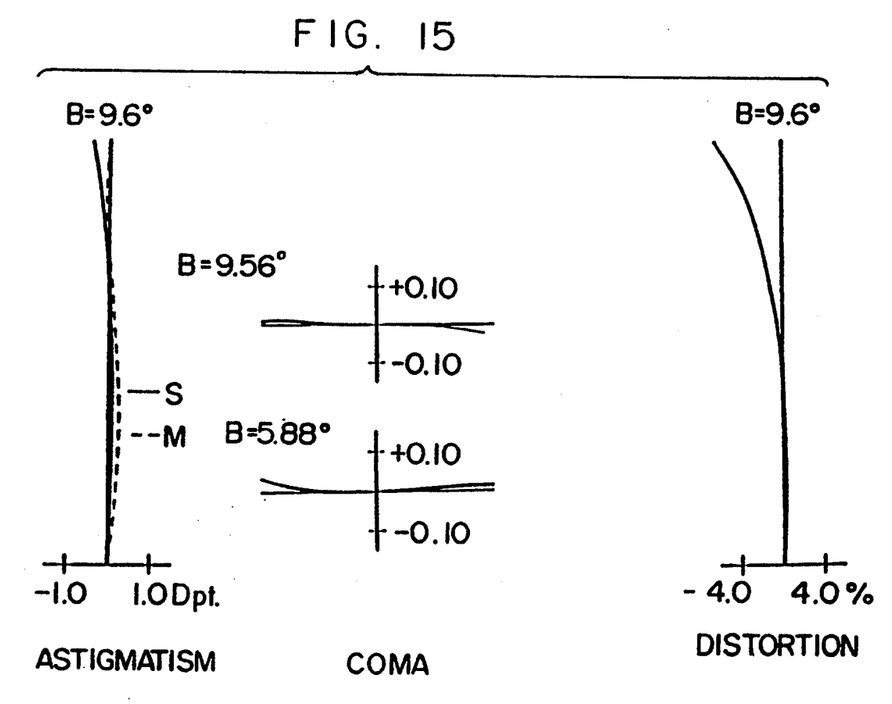
FIG. 15 is a diagram showing an aberration of a lens system at a large magnification, as shown in FIG. 13; and, FIG. 16 is a diagram showing an aberration of an Albada system, as in a lens system shown in FIG. 13.
Figure 16:
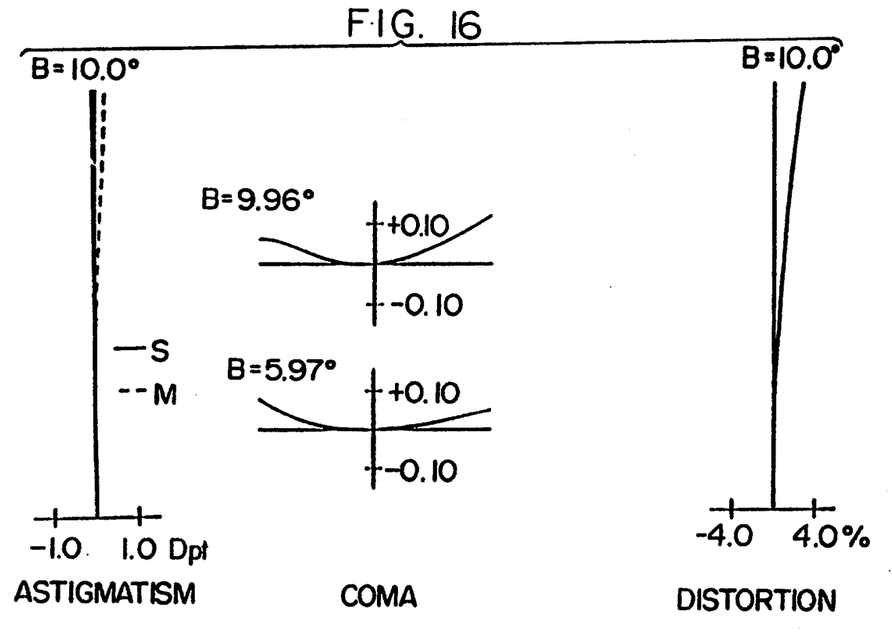

FIG. 13 shows a fourth embodiment of an Albada zoom finder, according to the present invention, similar to FIG. 1. Table 4, below, shows lens data thereof. FIGS. 14 and 15 show aberration diagrams at a small magnification and a large magnification. FIG. 16 shows an aberration diagram of an Albada system in the lens arrangement, respectively.

TABLE 4

$\omega = 24° \sim 17°$

| Surface No. | r | d | N |
| --- | --- | --- | --- |
| 1 | * −111.400 | 3.070 | 1.49176 |
| 2 | * −20.600 | 0.500~9.400 | |
| 3 | * −21.400 | 1.400 | 1.49176 |
| 4 | * 27.450 | 10.880~1.980 | |
| 5 | * −7.700 | 1.350 | 1.49176 |
| 6 | 64.700 | 8.750 | |
| 7 | ∞ | 2.100 | 1.49176 |
| 8 | * −11.188 | 13.000 | |

In Table 4, * designates an aspheric surface, and the aspheric data is as follows.

| Surface No. 1: | $K = -5.55 \times 10^2$; | $A4 = -1.138 \times 10^{-4}$; |
| --- | --- | --- |
| | $A6 = 1.204 \times 10^{-6}$; | $A8 = -1.574 \times 10^{-9}$ |
| Surface No. 2: | $K = 3.72 \times 10^{-1}$; | $A4 = -1.015 \times 10^{-5}$; |
| | $A6 = 1.025 \times 10^{-6}$; | $A8 = -7.089 \times 10^{-10}$ |
| Surface No. 3: | $K = -7.53 \times 10^1$; | $A4 = 1.448 \times 10^{-4}$; |
| | $A6 = 3.589 \times 10^{-6}$; | $A8 = -2.388 \times 10^{-8}$; |
| | $A10 = -8.610 \times 10^{-13}$ | |
| Surface No. 4: | $K = 1.68 \times 10^1$; | $A4 = 8.504 \times 10^{-4}$; |
| | $A6 = -1.596 \times 10^{-5}$; | $A8 = 5.508 \times 10^{-7}$; |
| Surface No. 5: | $k = -1.49 \times 10^{-1}$; | $a4 = 4.408 \times 10^{-4}$; |
| | $A6 = 1.096 \times 10^{-5}$; | $A8 = 6.571 \times 10^{-8}$; |
| | $A10 = -8.218 \times 10^{-9}$ | |
| Surface No. 8: | $K = -8.921 \times 10^0$; | $A4 = -6.538 \times 10^{-4}$; |
| | $A6 = 1.780 \times 10^{-5}$; | $A8 = -3.191 \times 10^{-7}$ |

As can be seen from the above description, since the zoom finder of the present invention is comprised of four lens assemblies, each being Preferably made of a single lens, and since the variable power lens is constituted only by the second negative lens assembly, a simple, small and inexpensive Albada zoom finder can be produced.

If the fourth positive lens assembly is provided on the lens surface thereof, on the viewing side, with an aspheric surface having a positive refractive index which decreases in the radial direction toward the circumferential portion thereof, the curvature of the field of the Albada optical system can be corrected. Namely, the Albada optical system is prevented from having a positive dioptric power at the circumferential portion. Accordingly, this embodiment can be advantageously applied to an Albada type zoom finder.

According to the embodiment in which the first positive lens assembly comprises a meniscus lens having, on the object side, a concave surface which has a radius of curvature larger than that of the surface thereof on the viewing side, and the lens surface of the second negative lens assembly on the object side has a radius of curvature having an absolute value which is smaller than that of the lens surface thereof on the viewing side, not only the aperture diameter of the first positive lens assembly can be reduced, but also the displacement of the second negative lens assembly can be easily increased, resulting in an increased magnification.

According to the embodiment in which the lens surfaces of the lens assemblies other than the lens surface of the third negative lens assembly on the viewing side and the lens surface of the fourth positive lens assembly on the object side are made of aspheric surfaces, the aberration (astigmatism, coma, distortion, etc.) can be effectively corrected and the aperture diameters of the lens assemblies can be effectively reduced.

What is claimed is:

1. An Albada zoom finder comprising a first lens assembly of positive power, a second lens assembly of negative power, a third lens assembly of negative power and a fourth lens assembly of positive power, arranged in this order from an object side, an Albada frame provided on an object side lens surface of said fourth positive lens assembly, and a reflecting surface provided on a viewing side lens surface of said third negative lens assembly, wherein only said second negative lens is movable as a variable power lens assembly, and wherein each of said four lens assemblies is comprised of a single lens, said fourth positive lens being provided with an aspheric surface having a positive refractive power which decreases in a radial direction toward a circumferential portion of said aspheric surface, said aspheric surface being provided on a viewing side of said fourth lens assembly.

2. An Albada zoom finder according to claim 1, wherein said lens assemblies are all made of plastic lenses.

3. An Albada zoom finder according to claim 1, wherein said first positive lens comprises a meniscus lens having a concave surface on an object side.

4. An Albada zoom finder according to claim 1, wherein a lens surface of said second negative lens on an object side has a radius of curvature having and absolute value which is smaller than that of a lens surface on a viewing side.

5. An Albada zoom finder according to claim 1, wherein the lens surfaces of the lenses, other than the lens surface of said third negative lens assembly on the viewing side and the lens surface of said fourth positive lens on the object side, are made of aspheric surfaces.

6. An Albada zoom finder according to claim 1, wherein a lens surface of said second negative lens on an object side has a radius of curvature having an absolute value which is smaller than that of a lens surface on a viewing side.

7. An Albada zoom finder according to claim 1, wherein the lens surfaces of the lenses, other than the lens surface of said third negative lens on the viewing side and the lens surface of said fourth positive lens on the object side, are made of aspheric surfaces.

8. An Albada zoom finder according to claim 6, wherein the lens surfaces of the lenses other than the lens surface of said third negative lens on the viewing side and the lens surface of said fourth positive lens on the object side, are made of aspheric surfaces.

9. An Albada zoom finder according to claim 3, wherein a lens surface of said second negative lens on an object side has a radius of curvature having an absolute value which is smaller than that of a lens surface on a viewing side.

10. An Albada zoom finder according to claim 3, wherein the lens surfaces of the lenses, other than the lens surface of said third negative lens on the viewing side and the lens surface of said fourth positive lens on the object side, are made of aspheric surfaces.

11. An Albada zoom finder according to claim 9, wherein the lens surfaces of the lenses, other than the lens surface of said third negative lens on the viewing side and the lens surface of said fourth positive lens on the object side, are made of aspheric surfaces.

12. An Albada zoom finder according to claim 4, wherein the lens surfaces of the lens other than the lens surface of said third negative lens on the viewing side and the lens surface of said fourth positive lens on the object side are made of aspheric surfaces.

* * * * *

UNITED STATES PATENT AND TRADEMARK OFFICE
CERTIFICATE OF CORRECTION

PATENT NO. : 5,353,158

DATED : October 4, 1994

INVENTOR(S) : Hirofumi MATSUO

It is certified that error appears in the above-indentified patent and that said Letters Patent is hereby corrected as shown below:

On the title page, item [56], line 2 under Foreign Patent Documents, change "58-129017" to ---58-149017---.
At column 6, line 48 (claim 4, line 3), change "and" to ---an---.

Signed and Sealed this

Twenty-fifth Day of July, 1995

Attest:

BRUCE LEHMAN

Attesting Officer   Commissioner of Patents and Trademarks